United States Patent Office 3,472,891
Patented Oct. 14, 1969

3,472,891
PROCESS FOR CONTINUOUS RECOVERY
OF DICYANOBENZENES
Osamu Ikeda, Kazuo Ayaki, and Haruhiko Ohya, Tokyo, Japan, assignors to Showa Denko Kabushiki Kaisha, Tokyo, Japan, a corporation of Japan
Filed Feb. 3, 1967, Ser. No. 613,868
Claims priority, application Japan, Feb. 8, 1966, 41/6,942
Int. Cl. C07c 121/02, 121/20
U.S. Cl. 260—465
1 Claim

ABSTRACT OF THE DISCLOSURE

A process for continuously recovering dicyanobenzene which comprises bringing hot gas mixture containing dicyanobenzene in low concentration into contact with stream of finely divided water, crystallizing out said dicyanobenzene by cooling at the rate of 100° C. per second max., producing aqueous slurry containing said crystals and separating them from the slurry.

---

Figure 1:
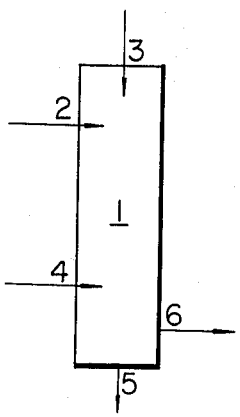

The present invention relates to a process for collecting dicyanobenzene in a solid form effectively and continuously from hot gas mixture containing said dicyanobenzene in a vapor state and low concentration. A gas mixture containing the dicyanobenzene in a vapor state and low concentration are obtained, for example, as the product of the vapor phase reaction involved in the so-called ammoxidation process of xylene. The reaction product gas in this case consists of gas mixture of 5 percent by volume, max., usually about 2 percent by volume of dicyanobenzene, as the objective product, and ammonia, carbon dioxide, carbon monoxide, hydrogen cyanide, air and steam. It is extremely difficult to completely separate and collect the dicyanobenzene from such gas mixture. This is due to the fact that the content of the dicyanobenzene is considerably low as described above, and that the dicyanobenzene isomers have each relatively high melting point as 140 to 141° C. for phthalonitrile, 160 to 161° C. for isophthalonitrile and 222 to 224° C. for terephthalonitrile. Furthermore, the gas mixture contains toxic substances such as ammonia, carbon monoxide and hydrogen cyanide, and upon cooling, the dicyanobenzene contained in said mixture are liable to be condensed into a colloidal state with the resultant formation of fume.

Hitherto, certain methods have been proposed to collect high melting substances retaining a solid form at normal temperature from hot gas containing them.

For example, the first of these processes comprises condensing said substances by indirect cooling, causing them to crystallize out on the wall of the system and scraping out the crystals, or taking out by melting said crystallized deposits on the wall.

The second consists in mixing cold inert gas with hot gas mixture so as to reduce the temperature of the latter, causing high melting substances contained therein to crystallize out and collecting the crystals by means of a cyclone or the like.

The third is to bring hot gas mixture into contact with a solvent capable to dissolve high melting substances and to extract said substances from large volume of gas.

The fourth is a method of bringing hot gas mixture into contact with large volume of a liquid coolant such as water and taking out high melting substances in slurry.

However, for many reasons, any of the aforementioned previous methods is not applicable quite satisfactorily to the collection of dicyanobenzenes from hot gas containing them in low concentration.

In the first method, dicyanobenzenes are little likely to form fume. However, the method has the shortcomings that due to low content of dicyanobenzenes in the hot gas mixture, it is necessary to provide extremely large wall surface for crystallization or to install expensive accessory facilities.

The second method not only requires considerably large amount of cooling gas but also imparts heavy load to collecting devices such as a cyclone, bag filter, etc. due to the reduced concentration of the object to be collected. Moreover, the method has the disadvantage that fume is likely to be formed at the zone where the cooling gas comes directly in contact with the hot gas mixture.

In the third method, large quantity of costly solvent must be used, and their contact with hot gas is apt to cause their loss or deterioration. Furthermore, the selection of such solvent is also limited. Thus this method is accompanied with great difficulties.

The last mentioned fourth method appears to be a suitable one which requires least cost and floor space for the equipment involved.

Therefore, we tried to cool hot gas mixture by conducting the same containing dicyanobenzenes in low concentration into stream of large quantity of cooling water, cause the dicyanobenzenes to crystallize out and collect said crystals along with the cooling water. In this case, however, we found that most of the dicyanobenzenes thus precipitated formed fume, making it difficult to completely collect them. The fume is the state of crystals deposited being floated in the gaseous phase in the form of extremely fine particles with a diameter of the order of 0.1 to 10 microns. The greater part of the misty particulate crystals is not collected into the water, but escapes in entrainment with other gases present. Thus the almost all of misty crystals are lost due to failure of collection. Moreover, the small portions of said crystals occluded in the cooling water are not only very difficult to filter out, but also, even if filtered, they contained much water, because they consist of fine particles, so that their drying would require considerable cost. The formation of fume is deemed to occur probably because the crystal nuclei of dicyanobenzenes are generated in considerable numbers due to sudden cooling of the hot gas mixture, and the growth of crystals can not fully keep in pace with the speed of said generation.

The object of the present invention is to overcome all the shortcomings accompanying the previously proposed separating methods as described above and to provide an industrially feasible process whereby the dicyanobenzenes can be recovered effectively and continuously from hot gas mixture containing the same.

The present invention relates to a process for recovering dicyanobenzene in a solid form effectively and continuously from hot gas mixture containing said dicyanobenzene in concentration of 5 percent by volume max., which comprises bringing said gas mixture directly into contact with stream of finely divided water in the upper part of a nonpacked column where said water stream is introduced at temperature at least 10° C. higher than those at which the dicyanobenzene crystallizes out, running both of them concurrently down the column, with the amount of said finely divided water limited to the extent that the cooling rate of the downflowing gas mixture does not exceed 100° C. per second thus the dicyanobenzene do not form fume, cooling the down flowing gas mixture to below the temperature at which the dicyanobenzene crystallizes out, bringing the crystals of dicyanobenzene into contact with another stream of water for collection in the lower part of the column where the gas mixture have carried said crystals therewith, producing aqueous slurry of the crystals of dicyanobenzene, taking out the slurry and separating said crystals of dicyanobenzene from the aqueous slurry.

Figure 2:
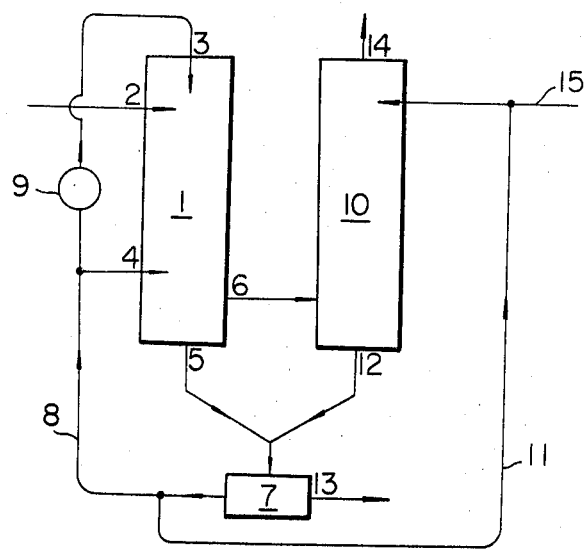

The process of the present invention will be described hereinafter in detail with reference to the attached drawings. FIG. 1 in a diagrammatic illustration of a type of column used in carrying out the process of the present invention. FIG. 2 is a diagrammatic illustration of a type of apparatus including facilities attached to the column.

Numeral 1 in FIG. 1 represents a nonpacked column for collection. Gas mixture containing dicyanobenzenes is introduced into the column at its upper part 2, and finely divided water is made to shower from the column top 3. While mixed stream of said gases and water is flowing down the column, the dicyanobenzenes crystallize out of the gas. Another water stream for collection is carried into the lower part 4 of the column. As a result, aqueous slurry of the crystallized dicyanobenzenes is formed here. The slurry is discharged from the column bottom 5, while the exhaust gas is let out at a point 6 below 4. The crystals of dicyanobenzenes are separated from the slurry leaving the column bottom 5. FIG. 2 is an illustration of a preferable type of system applicable to practical operation. In FIG. 2, the numerals 1 to 6 represent the same parts as described in FIG. 1. The solid and liquid phases of the slurry carried out of the column bottom 5 are separated from each other by means of a solid-liquid separator 7. The crystals of the dicyanobenzenes are taken out of the separator at 13. On the other hand, part of the water phase separated from the slurry is recycled to the column top 3 through line 8 for use as water stream for crystallization and also to the lower part 4 of the column for use as collection water. It is preferable to regulate the temperature of the water supplied to the column top 3 by a water temperature regulator 9. If this water is used in the form containing some amounts of the crystals of dicyanobenzenes, it will help to promote the formation of larger size crystals within the column. Consequently part of the slurry leaving the column bottom 5 may be recirculated directly to the column top 3. The exhaust gas released from the column 1 may be wasted as it is. However, to collect very small amounts of the dicyanobenzenes which might escape in entrainment with said exhaust gas, it is possible to conduct them to the bottom of the second column 10 and bring them countercurrently into contact with part of the separated water phase from 7 which is sprayed from the second column top through line 11. The exhaust gas thus washed is expelled out of the second column top 14. The washings are returned to the separator 7 through the second column bottom 12. Since small portions of the total water volume within the system are carried out of 13 and 14, make-up water is introduced through line 15.

The inventors have discovered that as the cooling rate of hot gases containing dicyanobenzenes exceeds 100° C. per second, the formation of fume by the dicyanobenzenes is moreaccelerated, whereas the fall of said cooling rate to below 100° C. per second substantially prevents the formation of such fume. Therefore, if, in carrying out the process of the present invention, care is taken to prevent the cooling rate of the hot gas from rising above 100° C. per second while they are running down the aforesaid column 1, the desired object can be attained.

The cooling rate of the hot gas is related to the volume ratio of the gas stream to the stream of finely divided water made to contact therewith, the extent to which said water is dispersed, namely, the particle size distribution of water particles, and the temperature differentials between the gas and the water. The values of the relationships can be determined in advance easily by experimental measurements.

For illustration, the results of our measurements, are given below. The gas used in our measurements consisted of gas mixture containing 2.0 percent by volume of terephthalonitrile obtained by ammoxidation of para-xylene. The gas temperature at the column inlet was 180° C. and the temperature of the cooling water 50° C. When the cooling rate of the gas mixture remained below 100° C. per second the formation of fume by disocyanates was little observed, whereas the rise of said rate beyond 100° C. per second resulted in noticeable occurrence of fume.

TABLE 1.—COOLING RATE OF GAS (° C. PER SECOND)

| Ratio by wt. of water to gas | Water particle diameter (mm.) | | |
|---|---|---|---|
| | 0.2 | 0.4 | 1.0 |
| 0.1 | 34 | 13 | 2 |
| 0.2 | 65 | 25 | 5 |
| 0.4 | 100 | 40 | 9 |
| 0.6 | 120 | 50 | 12 |
| 1.0 | | 65 | 17 |
| 3.0 | | 100 | 30 |
| 6.0 | | 120 | 40 |

As seen from the above results, the smaller the diameter of water particles, the larger the volume ratio of water to gas, the higher will be the cooling rate of the gas. Thus based on the results of measurements, it is possible easily to establish the conditions for maintaining the cooling rate of the gas at the desirable level of less than 100° C. per second. Of course, the greater the initial temperature differentials between the gas and the water, the higher will be the cooling rate of the gas. Therefore, when the gas mixture is introduced at high temperature, it is preferable to raise the temperature of the finely divided water to be used first in contact with the gas in advance up to, for example, about 95° C. in order to reduce the temperature differential between the gas and the water and also to avoid the sudden cooling of the gas. Although said cooling rate is selected according to the height of the column used, the preferable rate usually ranges between 20 and 60° C. per second. If the cooling rate of the gas is selected at too low level, it will take long time to cool the gas to the temperature at which dicyanobenzenes crystallize out, thus bringing about the disadvantage of requiring a tall column. The size of water particles can be regulated by changing, for example, the diameter of the nozzles in the distributor. It will be understood from the foregoing explanation that water amount for crystallization of dicyanobenzenes without the formation of fume is rather small.

Since the gas supplied to the upper part of the column consists of mixture containing dicyanobenzenes in a vapor state, the temperatures of the gas is, of course, higher than those at which the dicyanobenzenes crystallize out. Accordingly, to carry out the crystallization of dicyanobenzenes effectively, it is desirable to select the lowest possible temperature of the gas mixture to be introduced, namely, as close as possible to those required for said crystallization. However, if the selected temperature of the gas mixture is too low the dicyanobenzenes will rapidly crystallize out too early at the column inlet, resulting in its clogging. Thus it is advisable to select the temperature of the gas mixture to be supplied to the column which is at least 10° C., preferably 30 to 50° C., higher than the crystallizing temperature of dicyanobenzenes contained therein.

The foregoing crystallizing temperature of dicyanobenzenes depends essentially on the concentration of the dicyanobenzenes in the gas mixture. In other words, said crystallizing temperature can be determined readily from the vapor pressure curve of dicyanobenzenes. For instance, with the gas mixture containing 2 percent by volume of terephthalonitrile, the temperature at which the terephthalonitrile content begins to crystallize out is 170° C. Consequently the temperature at which such gas mixture is introduced into the column should be higher than 180°

C., preferably 200 to 220° C. The gas mixture containing about 2 percent terephthalonitrile is obtained from, for example, the ammoxidation of para-xylene at 300 to 550° C. Therefore, in case the gas is to be treated according to the process of the present invention, it is preferable to precool the gas to the desired temperature as described above.

As seen from the foregoing explanation, the freedom of the process of the present invention from fume caused by dicyanobenzenes is deemed due to the fact that unlike the case where the gas mixture is rapidly cooled by being initially brought into contact with large volume of water for cooling, its first contact with small amount of finely divided water at appropriate temperature eliminates its sudden cooling and reduces the number of the crystal nuclei of dicyanobenzenes formed and the growth of said crystals is fully carried out. In other words, since only small amount of water initially come in contact with the gas mixture introduced, the gas mixture is not subjected to instantaneous rapid cooling due to the sensible heat of water. However, while the stream of the gas and the small amount of water are flowing down, evaporation of the particles of said water takes place to large extent, and due to the large amount of latent heat of said evaporation, the temperature of the gas mixure is reduced at an appreciably fast and a uniform rate, resulting in the complete precipitation of relatively large crystals of dicyanobenzenes and the aggregation of crystals by depositing on the surface of water particles or suspending in the water particles.

As described above, while the gas mixture is running down the column along with finely divided water, the dicyanobenzenes contained therein are cooled to the temperature of their crystallization without forming fume in a relatively short period of time, during which said crystallization is completed. The stream containing these crystals flows further down to the lower part of the column, where it converges with another stream of water for collection introduced here, thus resulting an aqueous slurry of said crystals. Since the crystallized particles of the dicyanobenzenes are no longer liable to form fume, the amount of said collection water is not particularly limited. It will be sufficient if it is suitable to form aqueous slurry of a convenient concentration for collection of the precipitated crystals and also for subsequent processing. The remaining water-insoluble gaseous components are vented as waste, or carried to separate equipment for recovery of useful ingredients or further subjected to water washing in order to collect minute amount of dicyanobenzenes which might escape by entrainment.

The aqueous slurry discharged from the column bottom is subjected to filtration, centrifuging or other appropriate means of separation to recover the crystals of dicyanobenzenes. Due to the relatively large size of crystals, such separation of solids from slurry can be easily performed.

As mentioned above, the process of the present invention makes it possible to collect dicyanobenzenes from gas mixture containing the same in low concentration continuously and almost completely in the crystallized form easy of handling. The process of the present invention also enables operation to be conducted in a closed system without being affected by any toxic substance that might be present in the gas mixture.

The process of the present invention will be understood more clearly with reference to the examples which follow. The collection yields stated therein represent percentages on the basis of the weight of the dicyanobenzenes contained in the starting gas mixture.

EXAMPLE 1

Gas mixture containing 1.5 percent by volume of isophthalonitrile obtained by ammoxidation of metal-xylene was introduced at the rate of 2 m.$^3$ per minute into the upper part of a nonpacked column 250 mm. in diameter, 6 m. in height. The isophthalonitrile content of said gas crystallizes out at 140° C. The gas was conducted to a collection column after being cooled to about 160° C. in a precooler. Water for crystallization at about 80° C. which had been divided into fine particles having a mean diameter of about 0.4 mm. was made to shower from the column top at the rate of 1 liter per minute and run down concurrently with said gas mixture, while kept in direct contact therewith. The gas was cooled at the rate of about 50° C. per second. The lower part of the collection column consisted of a spray chamber where collection water at normal temperature was jetted at the rate of 100 liters per minute to collect crystallized isophthalonitrile. The collection yield was 99.5 percent. The crystals of said nitrile in the slurry were large, namely, had a mean particle diameter of about 0.15 mm. when subjected to sieve analysis after being filtered and dried.

Control 1

Under the same conditions as in Example 1, excepting the rate of 10 liters per minute, and normal temperature being used, crystallization water having a mean particle diameter of about 0.4 mm. was let fall in dispersion directly from the top of the collection column. However, the exhaust gas after treatment with collection water contained considerable amount of fume-like dust. The cooling rate of the gas mixture introduced exceeded 200° C. per second. The collection yield was 93 percent. The crystals of isophthalonitrile in the slurry were so fine that their particle diameter was about 0.01 mm. The slurry presented resistance to filtration about 10 times as much as that which was experienced in the foregoing Example 1. Deposition of crystals on the column walls occurred far more largely than in Example 1.

Control 2

Gas mixture of the same composition as in Example 1 was used. The total quantity of water required was made to shower in dispersion from the column top at the rate of 100 liters per minute. The initial cooling rate of the gas was too great to be determined. Fume arose vigorously, and the collection yield of isophthalonitrile was only about 83 percent.

EXAMPLE 2

Gas mixture containing 2 percent by volume of terephthalonitrile obtained by ammoxidation of para-xylene was precooled to about 180° C. (The terephthalonitrile begins to crystallize out at 170° C.) The gas mixture was introduced into the same column as was used in Example 1 at the rate of 1.5 m.$^3$ per minute. Crystallization water at about 90° C. which had been divided into fine particles having a mean diameter of about 0.2 mm. was made to shower from the column top at the rate of 0.5 liter per minute and run down concurrently with said gas mixture, while kept in direct contact therewith. The gas was cooled at the rate of about 70° C. per second. In the lower part of the column, the crystals of the terephthalonitrile were collected by jetting collection water at the rate of 80 liters per minute. The collection yield was 99.0 percent.

We claim:

1. A process for continuously recovering dicyanobenzene in a solid form from a gas mixture resulting from the vapor phase ammoxidation of xylenes, which gas mixture contains said dicyanobenzene in a concentration of 5% maximum and other particular gaseous components, which process comprises bringing said gas mixture, at a temperature at least 10° C. higher than that at which the dicyanobenzene begins to crystallize out from said gas mixture, directly into contact with sprayed water in the upper part of an empty chamber; running said gas mixture and water concurrently down said chamber, the amount of said sprayed water being limited to the extent that the cooling rate of the down flowing gas mixture does not exceed 100° C. per second; cooling the down flowing gas mixture to below the temperature at which the dicyanobenzene crystallizes out to form crystals of dicyanobenzene, scrubbing said crystals of dicyanobenzene with a continuous stream of collection water introduced in the lower part of said chamber to produce an aqueous slurry of said crystals of dicyanobenzene; removing said slurry from said chamber; and recovering said crystals of dicyanobenzene from said aqueous slurry.

References Cited

UNITED STATES PATENTS

| | | | |
|---|---|---|---|
| 3,117,154 | 1/1964 | Kreysa | 260—465 |
| 3,278,573 | 10/1966 | Kroeper et al. | 260—465 |
| 3,284,483 | 11/1966 | Erner | 260—465 |
| 3,325,504 | 6/1967 | Grasselli | 260—465 X |

FOREIGN PATENTS 972,122  10/1964  Great Britain.

CHARLES B. PARKER, Primary Examiner

S. T. LAWRENCE III, Assistant Examiner

U.S. Cl. X.R.

55—82, 84, 85, 86; 260—704, 705